(12) United States Patent
Kronberger (10) Patent No.: US 9,651,013 B2
(45) Date of Patent: May 16, 2017

(54) LOW LEAKAGE SEAT VALVE GUIDE (75) Inventor: Maximilian Herbert Kronberger, Österreich (AT)

(73) Assignee: International Engine Intellectual Property Company, LLC, Lisle, IL (US)

( * ) Notice: Subject to any disclaimer, the term of this patent is extended or adjusted under 35 U.S.C. 154(b) by 248 days.

(21) Appl. No.: 14/395,648

(22) PCT Filed: Apr. 24, 2012

(86) PCT No.: PCT/US2012/034838
§ 371 (c)(1),
(2), (4) Date: Oct. 20, 2014

(87) PCT Pub. No.: WO2013/162525
PCT Pub. Date: Oct. 31, 2013

(65) Prior Publication Data
US 2015/0135532 A1 May 21, 2015

(51) Int. Cl.
*F02M 63/00* (2006.01)
*F02M 61/12* (2006.01)
*B23P 15/00* (2006.01)

(52) U.S. Cl.
CPC ....... *F02M 63/0033* (2013.01); *B23P 15/001* (2013.01); *F02M 61/12* (2013.01); *Y10T 29/493* (2015.01)

(58) Field of Classification Search
CPC .... F02M 63/0033; F02M 61/12; B23P 15/001
See application file for complete search history.

(56) References Cited

U.S. PATENT DOCUMENTS

| 936,838 A | * | 10/1909 | Wardell | B21D 1/06 |
| | | | | 72/479 |
| 6,338,445 B1 | * | 1/2002 | Lambert | F02M 45/086 |
| | | | | 137/630.22 |
| 8,006,661 B2 | | 8/2011 | Palumbo | |
| 2008/0083117 A1 | * | 4/2008 | Austin | B23P 15/16 |
| | | | | 29/890.09 |
| 2009/0308354 A1 | * | 12/2009 | Eisenmenger | F02M 47/027 |
| | | | | 123/476 |
| 2011/0147494 A1 | * | 6/2011 | Lewis | F02M 47/027 |
| | | | | 239/533.2 |

* cited by examiner

*Primary Examiner* — Moshe Wilensky
(74) *Attorney, Agent, or Firm* — Jack D. Nimz; Jeffrey P. Calfa (57) ABSTRACT An apparatus for setting a clearance has a movable body and a valve guide. A valve body is disposed along the axis of the movable body, and a bore hole is formed in the movable body. The bore hole is formed on the axis and includes a first bore with a first diameter, a receiving surface, and a second bore. A tool having a forward surface is inserted into the bore hole and pressed against the receiving surface. The flow of a fluid between the guide cylinder and the movable body is determined and compared against a standard. If it does not meet the criteria, the force is adjusted and reapplied until it meets the desired value.

7 Claims, 6 Drawing Sheets

LOW LEAKAGE SEAT VALVE GUIDE

BACKGROUND

Modern engines are increasingly required to be as efficient as possible, often running at very high pressures and temperatures. For example, modern diesel engines operate at fuel pressure levels of 300 MPa (approximately 43,500 psi) and higher. As a result, the valves must have extremely small guide clearances to achieve a minimum fuel return flow, or leakage, between the guide and the needle.

The predominant existing technique for guide matching is grind-matching the valve member, or needle, to fit the guide. This technique is able to set clearances of between two and four microns. However, since the amount of leakage decreases as a function of approximately the third power of the clearance value, there is an incentive to decrease the guide clearances even further.

SUMMARY

One embodiment includes a method for setting a clearance between a guide and a movable body that is slideably received into the guide. In this method, a bore hole is formed in the movable body along a longitudinal axis of the movable body. The bore hole includes a first bore having a first diameter. A receiving surface can be formed in the bore hole by forming a coaxial second bore to extend from a bottom of the first bore. The second bore has a second diameter that is smaller than the first diameter. A tool is inserted into the bore hole and a forward surface of the tool contacts the receiving surface of the bore hole. An axial driving force is applied to the tool, and the receiving surface translates a portion of the driving force radially outward. Responsive to the step of translating, a wall that is adjacent to the bore hole is outwardly displaced. The driving force on the tool is then relieved.

A first volume is pressurized to a first pressure with a fluid. The first volume is in fluid communication with a second volume at a second pressure through the clearance, which is disposed between an outside surface of the movable body and an inside surface of the guide.

A value of either a pressure difference between the first and second volumes or a flow rate of the fluid between the first and second volumes is determined and compared against a predetermined standard. If the value does not meet the predetermined standard, the driving force applied is adjusted, and the process is repeated.

A fuel injector comprises a movable body having a longitudinal axis and a bore hole. The bore hole is formed in the movable body on the axis and includes a first bore having a first diameter and a second bore that extends from the bottom of the first bore. The second bore has a diameter that is smaller than the first diameter. A valve guide is disposed around the axis and has an inner surface that is circumferentially adjacent to a portion of an outer surface of the movable body. A valve body laterally surrounds the valve guide. A clearance between the movable body and the inner surface of the valve guide is less than 2 microns.

A third aspect provides an apparatus comprising a movable body having a longitudinal axis. A valve guide is disposed along the axis and has an inner surface that is circumferentially adjacent to and radially outwardly disposed relative to a portion of an outer surface of the movable body. A valve body laterally surrounds the valve guide. A bore hole in the movable body is formed on the axis and includes a first bore having a first diameter, a receiving surface, and a second bore. The second bore extends from a bottom of the first bore. The second bore has a second diameter that is smaller than the first diameter.

A tool has a forward surface and a maximum forward surface diameter that is larger than the second diameter. The second bore hole has an axial length that is longer than an axial length of the forward surface, such that the forward surface of the tool abuts the receiving surface in the bore hole in a manner that exerts force radially outwardly from the axis.

BRIEF DESCRIPTION OF THE DRAWINGS

Further aspects can be discerned in the following Detailed Description, in which like characters denote like parts and in which.

DETAILED DESCRIPTION

Figure 1:
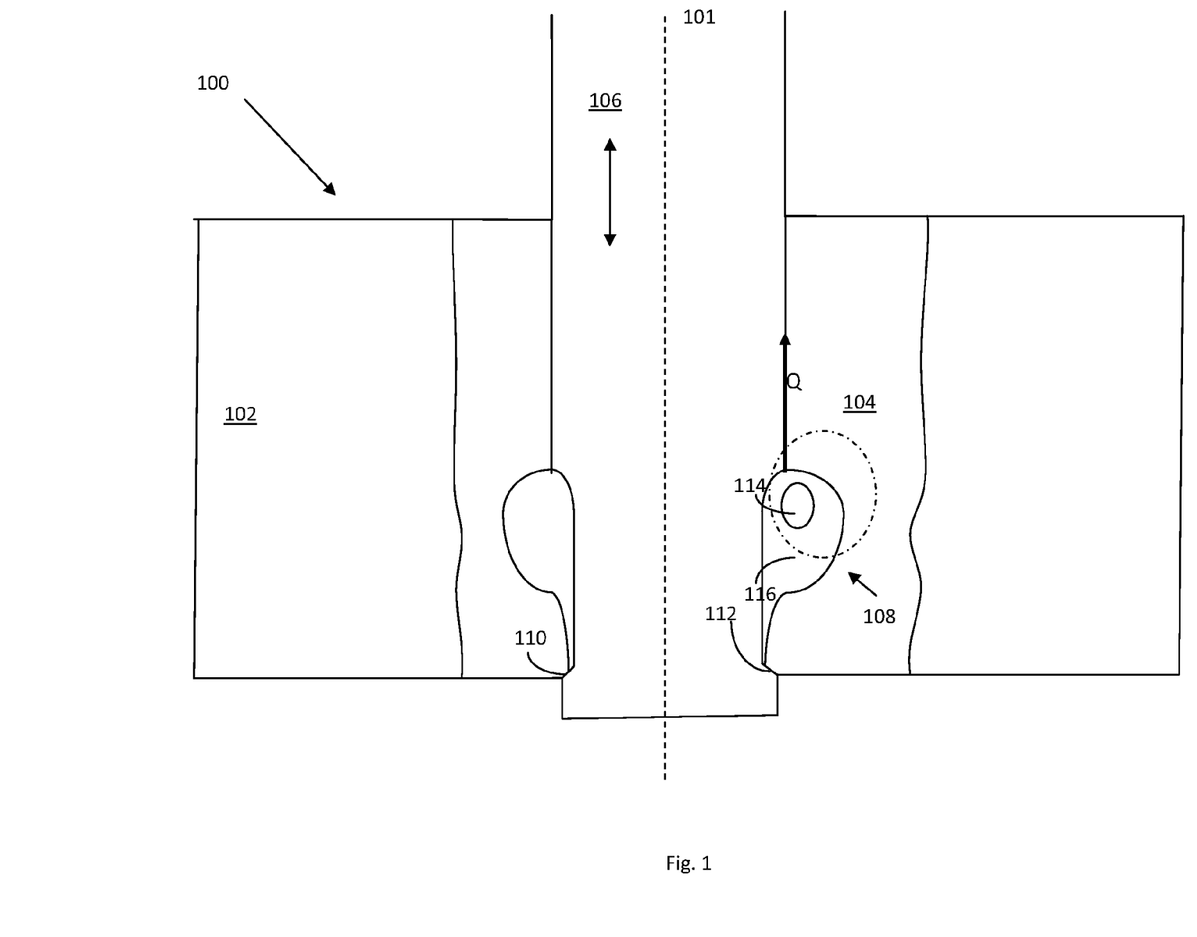
FIG. 1 is a side sectional view of a fuel injector needle, a guide, and a plate.

FIG. 1 shows a fuel injector assembly, indicated generally at 100, having a valve body 102, or plate, a needle 106, and a needle guide cylinder 104. The needle 106 has a longitudinal axis 101 and is movable within the guide cylinder 104, which is also disposed around the axis 101. The guide cylinder 104 is affixed to the valve body 102 or is a portion of the valve body itself. The needle 106 has a cone-shaped seating surface 110, which seats into a valve seat 112 formed into the guide cylinder 104.

In operation, the needle 106 moves, or strokes, as indicated by the up and down arrows of FIG. 1, within the guide cylinder 104, repeatedly seating and unseating the seating surface 110. In this manner, a highly compressed fuel (not shown) flows from the high-pressure inlet 114 into a chamber 108, or an annulus 116 and can be quickly dispersed for combustion within the engine cylinder (not shown).

Figure 1A:
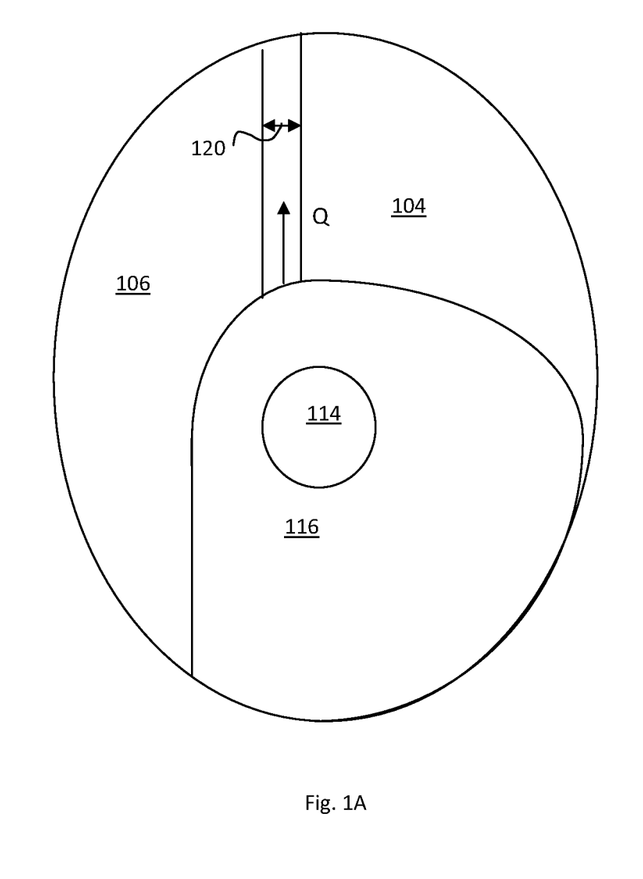

As described briefly above, modern engines are increasingly required to be as efficient as possible and to run at very high pressures and temperatures. As such, the clearances 120 (see FIG. 1A) between the moving parts, here the guide cylinder 104 and a fuel injector needle 106, need to be as small as possible to prevent leakage of the fuel. This type of leakage is indicated in FIGS. 1 and 1A, where the vertical arrow labeled Q shows the migration of the fuel from the high-pressure annulus, or chamber 116, to a lower pressure area above the plate 102.

Figure 2:
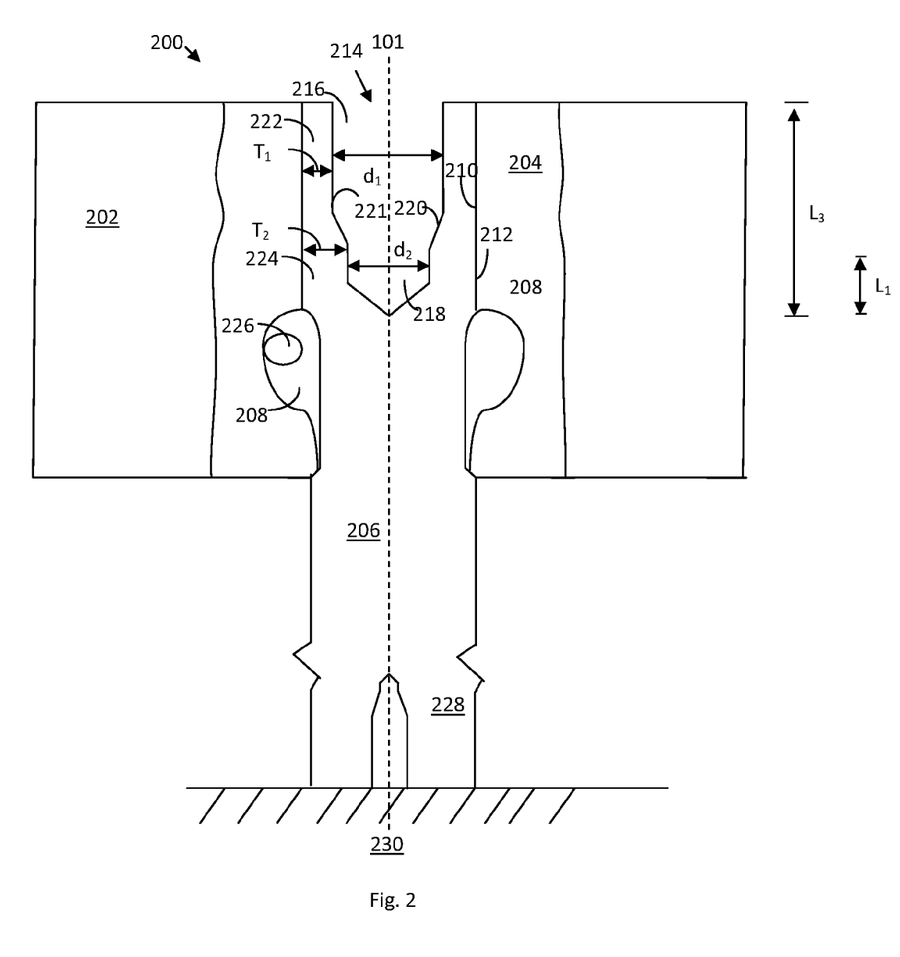
FIG. 2 is side sectional view of a fuel injector needle, a guide, a plate, and a bore hole according to a first aspect.

FIG. 2 shows a fuel injector assembly, indicated generally at 200. The injector 200 includes a fuel injector needle 206 disposed on a longitudinal axis 101 and a valve guide 204, which is also disposed around the axis 101. The valve guide 204 has an inside surface 210 that is circumferentially adjacent to and is radially outwardly disposed of a portion of an outside surface 212 of the fuel injector needle 206. A valve body, or plate 202, is also disposed about the axis 101 and laterally surrounds, or is affixed to, the valve guide 204 around its circumference.

A bore hole 214 is formed in the needle 206 to be along the axis 101. The bore hole 214 includes a first bore 216, a second bore 218, and a receiving surface 220 somewhere in the bore hole 214. The second bore 218 is formed to inwardly extend from a bottom 221 of the first bore 216. The first bore 216 has a first diameter $d_1$ and the second bore 218 has a second diameter $d_2$ that is smaller than the first diameter $d_1$. FIG. 2 shows the second bore 218 to be a cylinder with vertical walls, but it is contemplated that the second bore 218 could consist only of a cone with slanted walls. See FIG. 3A.

A first wall 222 surrounds the first bore 216 and has a first that thickness $T_1$ having a range of between approximately 0.3 millimeters to approximately 1.0 millimeters. More specifically, the first thickness may be 0.5 millimeters thick. A second wall 224 surrounds the second bore 218 and has a second thickness $T_2$ of between 0.3 millimeters to approximately 1.0 millimeters.

FIG. 2 also shows, in a manner similar to FIG. 1, a high-pressure inlet 226 and an annulus or chamber 208 into which a high-pressure fuel is fed.

Figure 2A:
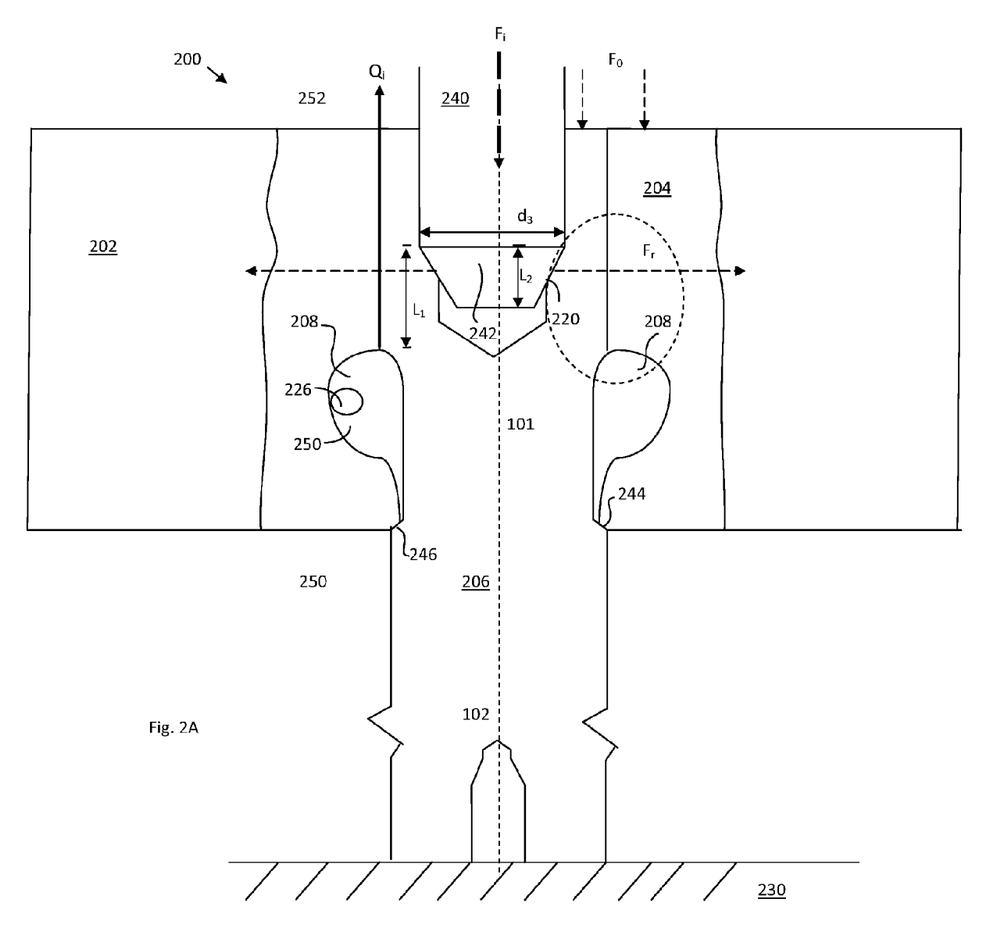
FIG. 2A is a side sectional view of a fuel injector needle, a guide, a plate, a bore hole, and a tool inserted into the bore hole according to the aspect shown in FIG. 2.

Referring to FIGS. 2 and 2A, a tool 240 has a forward surface 242 with a maximum forward surface diameter $d_3$ that is larger than the second diameter $d_2$, but is smaller than the first diameter $d_1$. The second bore hole 218 has an axial length $L_1$ that is longer than the axial length $L_2$ of the forward surface 242. See FIGS. 2 and 2A.

Figure 2B:
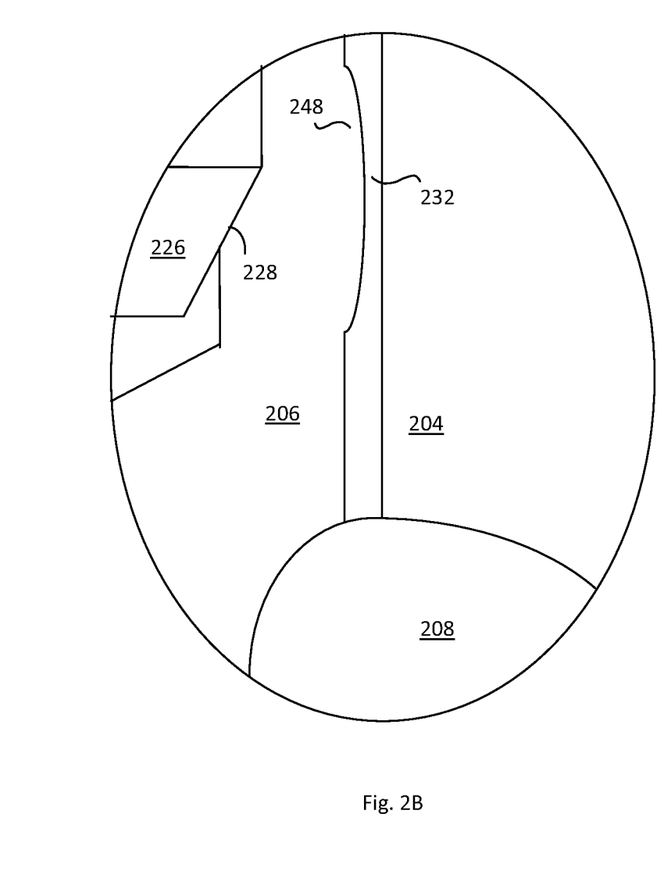
FIG. 2B is a detail of FIG. 2A showing deformation of the needle wall and a clearance of less than two microns.

The forward surface 242 of the tool 240 abuts, or contacts, the receiving surface 220 in a manner that exerts axially directed force $F_i$ radially outward from the axis 101, as indicated by the arrows $F_r$ of FIG. 2A. In a procedure that will be described in further detail below, if the tool 240 has enough force $F_i$, the forward surface 242 of the tool 240 can deform the receiving surface 220 of the needle 206 causing one or more walls 222, 224 of the fuel injector needle 206 to deform and be displaced radially outward. As shown in FIG. 2B, this outward displacement can decrease the clearance 232 between the fuel injector needle 206 and the guide 204 to less than 2 microns.

More specifically, Applicant has consistently achieved clearances of 1 micron (0.001 mm) within a tolerance ±0.5 microns. Further, the claimed process (described below) allows these clearances to be achieved within a mass series production process, meaning that less than ten parts out of one million are outside the specified tolerances.

FIG. 2 shows a total length $L_3$ of the bore hole 214 as being approximately 50% of the total length of the valve guide 204. This length $L_3$ may be increased or decreased according to the desired placement of the radial expansion and other mechanical requirements required to give the needle 206 the necessary structural integrity.

A variety of configurations for the forward surface 242 of the tool 240 may be used. As shown in FIG. 2A, the forward surface 242 and the receiving surface 220 may be cones with linear surfaces. More specifically, the angle of the cone of the forward surface 242 may be between approximately ten degrees (10°) and approximately ninety degrees (90°) when measured between opposing surfaces of the cone. Even more specifically, the angle of the forward surface 242 may be sixty degrees (60°).

Figure 3:
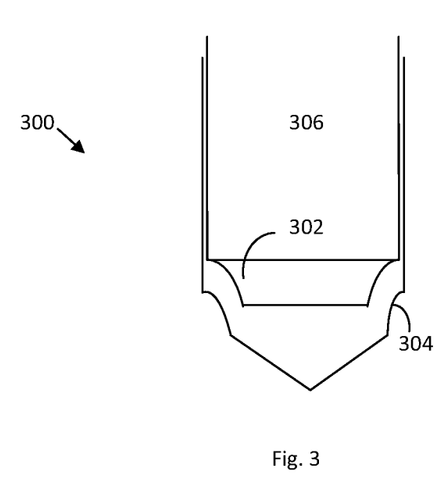
FIG. 3 is a side sectional view of a bore hole with a convex receiving surface and a tool with a concave forward surface.

In an alternate embodiment of the tool and bore hole assembly, indicated generally at 300 in FIG. 3, the forward surface 302 of the tool 306 and the receiving surface 304 may be concave and convex, respectively. These specific configurations are for illustrative purposes only and are not meant to limit the claims in any way. All that is required is that at least a portion of the axial force be directed outwardly.

Figure 3A:
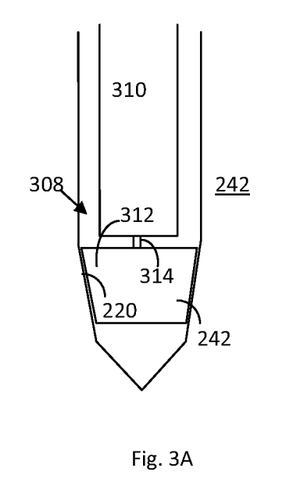
FIG. 3A is a side sectional view of a bore hole with a conical receiving surface and a tool with a removable tip.

FIG. 3A shows that the tool 308 may have a shaft 310 and a removable tip 312 that forms at least a portion of the forward surface 242 and remains in the bore hole 214 once the shaft is retracted (described below). The tip 312 may be connected to the shaft 310 with a connector 314, which may take a variety of forms. Exemplary connectors 314 can include a threaded connection, a mechanical interference fit, an adhesive, a magnetic attraction, or a material that breaks away when placed under compression, torsion, and/or tension. Alternatively, the removable tip 312 may be separate from the shaft and placed in the bore hole 214 apart from the shaft 310.

The removable tip 312 may take any number of shapes, including a cone, a ball, or other rounded shape. The shape of the removable tip 312 (or a non-removable tip, for that matter) need only provide a predictable forward surface 242 for contacting the receiving surface 220 of the bore hole 214. If the removable tip 312 is a cone, the cone angle may be less than thirty degrees (30°) to ensure that the compression stress (described below) creates enough friction between the receiving surface 220 and the forward surface 242 to keep the removable tip 312 embedded in the bore hole 214. Additionally, smaller cone angles reduce the amount of driving force $F_i$ because there is no elastic move back, or inward displacement, of the needle wall 222 and/or 224. Further, a smaller cone angle may reduce the retraction force needed to remove the tool 240.

While the discussion above refers specifically to fuel injector components, such as fuel injector needles and valve guides, the method described below can be applied to any movable body that reciprocally moves within a guide.

Figure 4:
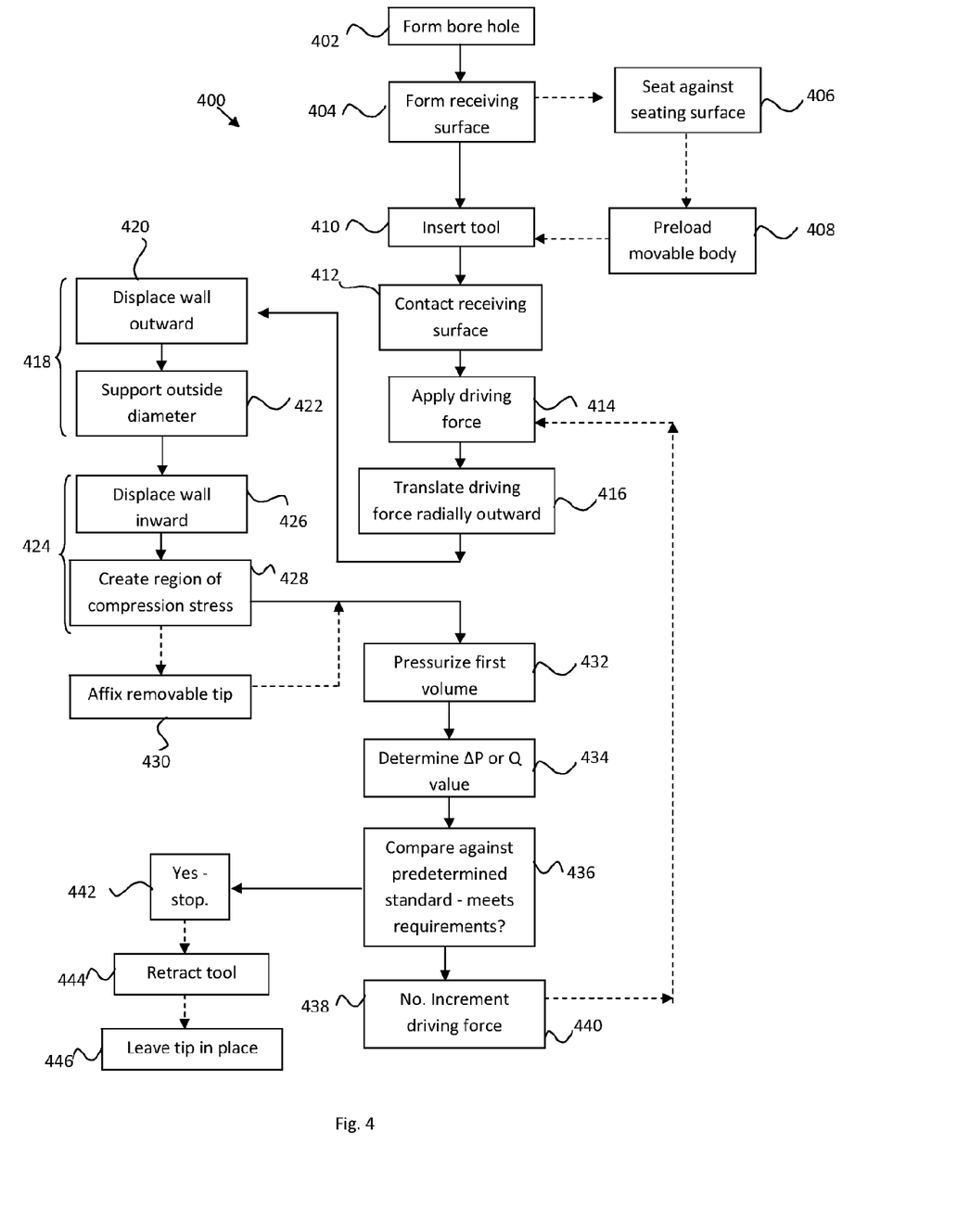
FIG. 4 is a flow diagram showing a method for setting a clearance between a guide and a movable body.

Referring to FIG. 4, a method, indicated generally at 400, for setting a clearance 232 between a guide 204 and a movable body 206 may involve an iterative process of slightly deforming the movable body, in this case, a fuel injection needle 206. A bore hole 214 similar to the one described above is formed (402) along a longitudinal axis 101 of the needle 206, and a receiving surface 220 is formed (404) in the bore hole 214 by forming a coaxial second bore 218 to inwardly extend from a bottom surface 221 of the first bore 216. The second bore has a second diameter $d_2$ which is smaller than the first diameter $d_1$. The tool 240 is inserted (410) into the bore hole 214, and the forward surface 242 of the tool 240 is contacted (412) with the receiving surface 220 of the bore hole 214.

Additional preliminary steps such as seating (406) a seating surface 244 (see FIG. 2A) against a seat 246 in the guide cylinder 204 and preloading (408) the needle 206 and/or the plate 202 and guide cylinder 204 with a seating force $F_0$ to ensure sufficient contact of the seating surface 244 with the seat 246 can be added. In later steps, the seating force $F_0$ helps maintain the desired pressure when pressurized air is introduced.

Once the forward surface 242 of the tool 240 is contacted (412) with the receiving surface 220, an axial driving force $F_i$ is applied (414) to the tool 240. As described earlier, the geometry of the forward surface 242 and the receiving surface 220 translates (416) a portion of the driving force $F_i$ radially outward.

If the driving force $F_i$ is large enough, the forward surface 242 of the tool 240 deforms (418) the receiving surface 220, displacing (420) a wall 222 and/or 224 that is adjacent to the bore 214, forming a barrel 248 (see FIG. 2B). Since the guide cylinder 204 and, consequently, the plate 202 are radially at least as thick as the diameter of the guide and are adjacent to the wall 222 and/or 224 of the needle 206 as it is displaced, an inside surface 210 of the guide cylinder 204 and the plate 202 may support (422) the wall 222 and/or 224 of the needle 206, preventing it from expanding too far outward.

Further, since the process of deforming (418) is partially elastic, upon relieving (424) the driving force $F_i$ on the tool 240, the barrel 248 may displace (426) slightly inwardly, ensuring the clearance 232 (see FIG. 2B) between the needle 206 and the guide cylinder 204 and creating (428) a region of compression stress within the barrel 248. Alternatively, if the tool 240 includes a removable tip 312 (see FIG. 3A), the barrel 248 may not be displaced (426) inwardly when the driving force $F_i$ is relieved (424), but may affix (430) the removable tip 312 to the receiving surface 220.

To determine whether the barrel 248 provides the proper clearance, a first volume 250 (see FIG. 2A) is pressurized (432) to a first pressure $P_1$ with a fluid, such as air. The first volume 250 is in fluid communication with a second volume 252, which is at a second pressure $P_2$. The first volume 250 connects to the second volume 252 through the clearance 232 that is disposed between the outside surface 212 of the needle 206 and an inside surface 210 of the guide 204.

The second volume 252 is shown in FIG. 2A as being on a top side of the guide cylinder 204 and the plate 202. As shown in FIG. 2A, the first volume 250 may be the annulus 208 or even an area below the guide cylinder 204 (provided that the seating surface 244 is displaced from the seat 246). If the annulus 208 is used as the first volume 250, the use of the seating force $F_0$ ensures that the pressurized fluid does not escape between the seating surface 244 and the seat 246. As shown in FIG. 2A, the seating force $F_0$ can also ensure solid contact between a supporting end 228 of the needle 206 and a support surface 230.

Since the clearance 232 can be correlated with either a flow rate $Q_i$ between the guide cylinder 204 and the needle 206 or a differential pressure $(P_1-P_2)$ across the system 200, a value (either flow or differential pressure) is determined (434) and compared (436) against a predetermined standard. If the value meets the standard, indicating that the clearance 232 meets the desired specification, no further iterations are necessary and the process stops (442). The tool 240 may be retracted (444), and, in the event that the tool 240 has a removable tip 312, the removable tip 312 is left (446) in place.

If the value does not meet the standard, indicating that the clearance 232 does not meet the desired specification, the driving force $F_i$ may be adjusted (438) and the process is repeated. Contemplated adjustments include increasing (440), decreasing, or maintaining the amount of driving force $F_i$. Successive iterations can be performed automatically through a closed loop process.

The described method is seen to be effective in establishing clearances of 1 micron (0.001 mm)±0.5 microns. This results in a fuel efficiency increase of between approximately 2% and approximately 4%.

In summary, the described apparatus and method provide clearances of less than 2 microns, which allows for higher efficiencies and lower emissions in internal combustion engines. Additionally, the described process can be implemented relatively inexpensively, making it an attractive option for engine manufacturers.

100—fuel injector assembly;
101—longitudinal axis;
102—plate;
104—needle guide cylinder;
106—needle;
108—chamber;
110—valve seat;
112—seating surface;
114—high-pressure inlet;
116—annulus;
200—fuel injector assembly;
202—valve body;
204—valve guide cylinder;
206—fuel injector needle;
208—annulus;
210—valve guide inside surface;
212—needle outside surface;
214—bore hole;
216—first bore;
218—second bore;
220—receiving surface;
221—bottom of first bore;
222—first wall;
224—second wall;
226—high-pressure inlet;
228—supporting end;
230—support surface;
232—clearance;
240—tool;
242—forward surface;
244—seating surface;
246—seat;
248—barrel;
250—first volume;
252—second volume;
300—tool and bore hole assembly;
302—forward surface;
304—receiving surface;
306—tool;
308—tool;
310—shaft;
312—removable tip; and
314—connector.

I claim:

1. A method for setting a clearance between a guide and a movable body slideably received into the guide, comprising the steps of:
   (a) forming a bore hole in the movable body along a longitudinal axis of the movable body, the bore hole including a first bore having a first diameter;
   (b) forming a receiving surface in the bore hole by forming a coaxial second bore to extend from a bottom of the first bore, the second bore having a second diameter smaller than the first diameter;
   (c) inserting a tool into the bore hole;
   (d) contacting a forward surface of the tool with the receiving surface of the bore hole;
   (e) applying an axial driving force to the tool;
   (f) translating a portion of the axial driving force radially outwardly with the receiving surface;
   (g) responsive to the step of translating, outwardly displacing a wall adjacent to the bore hole;
   (h) relieving the driving force on the tool;
   (i) pressurizing a first volume to a first pressure with a fluid, the first volume in fluid communication with a second volume at a second pressure through the clearance disposed between an outside surface of the movable body and an inside surface of a guide;

(j) determining a value of either a pressure difference between the first and second volumes or a flow rate of the fluid between the first and second volumes;
(k) comparing the value against a predetermined standard; and
(l) if the value does not meet the desired standard, adjusting the driving force applied in step (e) and repeating steps (e)-(l).

2. The method for setting clearances of claim 1, further comprising the substep of supporting an outside surface of the outwardly displaced wall with the inside surface of the guide, the inside surface of the guide forming a portion of a plate having a thickness that is larger than a diameter of the guide.

3. The method for setting clearances of claim 1, wherein the step of relieving the driving force comprises the sub steps of inwardly displacing the wall of the movable body and creating a region of residual compression stress.

4. The method for setting clearances of claim 1, further comprising the steps of affixing a removable tip of the tool to the receiving surface;
retracting a shaft of the tool; and
leaving in place the removable tip.

5. The method for setting clearances of claim 1, further comprising the steps of:
prior to step (e), seating a seating surface of the movable body against a seat formed into the guide; and
preloading the movable body and guide with a seating force.

6. The method for setting clearances of claim 1, wherein the movable body is a fuel injection needle.

7. The method for setting clearances of claim 1, wherein the step of adjusting the driving force comprises the substep of incrementing the driving force.

* * * * *